United States Patent
Makida et al.

(10) Patent No.: US 9,428,354 B1
(45) Date of Patent: Aug. 30, 2016

(54) TRANSPORT DEVICE, IMAGE FORMING APPARATUS, AND IMAGE READING APPARATUS

(71) Applicant: FUJI XEROX CO., LTD., Tokyo (JP)

(72) Inventors: Seigo Makida, Kanagawa (JP); Takao Furuya, Kanagawa (JP); Kiyoshi Hosoi, Kanagawa (JP); Kiichiro Iijima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/831,229

(22) Filed: Aug. 20, 2015

(30) Foreign Application Priority Data

Mar. 19, 2015 (JP) ................. 2015-056114

(51) Int. Cl.
- *G03G 15/00* (2006.01)
- *B65H 5/06* (2006.01)
- *H04N 1/00* (2006.01)

(52) U.S. Cl.
CPC .......... *B65H 5/062* (2013.01); *H04N 1/00588* (2013.01); *H04N 1/00602* (2013.01); *H04N 2201/0081* (2013.01)

(58) Field of Classification Search
CPC ...... G03G 15/6502; G03G 15/6529; G03G 15/602; G03G 2215/00679
See application file for complete search history.

(56) References Cited

U.S. PATENT DOCUMENTS

| | | | | |
|---|---|---|---|---|
| 4,717,938 A * | 1/1988 | Tanjo | ............... | B32B 38/1866 271/161 |
| 6,349,193 B1 * | 2/2002 | Matayoshi | ............... | B41J 11/50 279/9.01 |
| 2003/0215274 A1 * | 11/2003 | Ahn | ............... | G03G 15/6502 399/388 |
| 2004/0251619 A1 * | 12/2004 | Goto | ............... | B65H 5/062 271/274 |
| 2004/0253010 A1 * | 12/2004 | Takahashi | ............... | G03G 15/6529 399/16 |
| 2008/0197563 A1 * | 8/2008 | Furuya | ............... | B65H 3/5261 271/265.01 |
| 2008/0232880 A1 * | 9/2008 | Noguchi | ............... | B65H 5/062 399/397 |
| 2008/0285097 A1 * | 11/2008 | Kitagawa | ............... | H04N 1/0057 358/498 |
| 2009/0254306 A1 * | 10/2009 | Ohshima | ............... | G03G 15/5029 702/170 |
| 2010/0124445 A1 * | 5/2010 | Tanaka | ............... | G03G 15/657 399/308 |
| 2010/0247196 A1 * | 9/2010 | Ichiki | ............... | G03G 15/6552 399/381 |
| 2012/0153567 A1 * | 6/2012 | Sawamura | ............... | B65H 29/125 271/272 |
| 2014/0061997 A1 * | 3/2014 | Miki | ............... | G03G 15/6529 271/10.01 |
| 2015/0008640 A1 * | 1/2015 | Kambayashi | ............... | B65H 7/125 271/265.04 |
| 2015/0147104 A1 * | 5/2015 | Miwa | ............... | G03G 15/6552 399/405 |

FOREIGN PATENT DOCUMENTS

JP    2011219276 A    11/2011

* cited by examiner

*Primary Examiner* — Clayton E LaBalle
*Assistant Examiner* — Ruifeng Pu
(74) *Attorney, Agent, or Firm* — Oliff PLC

(57) ABSTRACT

Provided is a transport device including a first roller that is driven to rotate by a driving section, and transports a recording medium, a second roller that includes a second rotating shaft and a second rotating section, and pushes the transported recording medium against the first roller, the second rotating section including a first member that comes into contact with the recording medium, and a second member that comes into contact with the second roller when the recording medium having a predetermined size is transported, and a measurement unit that measures speed at which second rotating shaft rotates, wherein a force with which the first member rotates the second rotating shaft is greater than a force with which the second member rotates the second rotating shaft.

5 Claims, 5 Drawing Sheets

TRANSPORT DEVICE, IMAGE FORMING APPARATUS, AND IMAGE READING APPARATUS

CROSS-REFERENCE TO RELATED APPLICATIONS

This application is based on and claims priority under 35 USC 119 from Japanese Patent Application No. 2015-056114 filed Mar. 19, 2015.

BACKGROUND (i) Technical Field

The present invention relates to a transport device, an image forming apparatus, and an image reading apparatus.

(ii) Related Art

A technique that detects the transport speed of a recording medium is known.

SUMMARY

According to an aspect of the invention, there is provided a transport device including:

a first roller that is driven to rotate by a driving section, and transports a recording medium;

a second roller that includes a second rotating shaft and a second rotating section, and pushes the transported recording medium against the first roller, the second rotating section including a first member that comes into contact with the recording medium, and a second member that comes into contact with the second roller when the recording medium having a predetermined size is transported; and a measurement unit that measures speed at which second rotating shaft rotates, wherein a force with which the first member rotates the second rotating shaft is greater than a force with which the second member rotates the second rotating shaft.

BRIEF DESCRIPTION OF THE DRAWINGS

Exemplary embodiments of the present invention will be described in detail based on the following figures, wherein.

DETAILED DESCRIPTION

Figure 1:
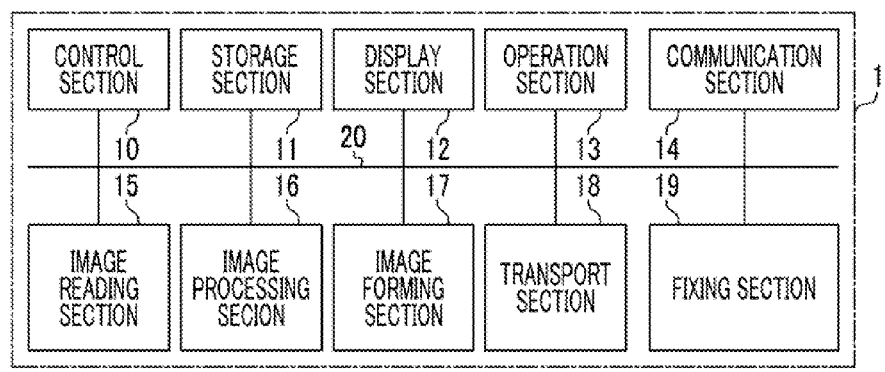
FIG. 1 is a block diagram that shows a hardware configuration of an image forming apparatus.

FIG. 1 is a block diagram that shows a hardware configuration of an image forming apparatus 1 according to an exemplary embodiment of the present invention. The image forming apparatus 1 is provided with a control section 10, a storage section 11, a display section 12, an operation section 13, a communication section 14, an image reading section 15, an image processing section 16, an image forming section 17, a transport section 18, and a fixing section 19. In addition, each section of the image forming apparatus 1 is connected to a bus 20, and performs the transfer of various kinds of data via the bus 20.

The control section 10 is a unit that controls the operations of each section of the image forming apparatus 1. The control section 10 is provided with an arithmetic processing unit such as a CPU (Central Processing Unit), and storage media (main storage units) such as a ROM (Read Only Memory) and a RAM (Random Access Memory). The CPU reads programs that are stored in the ROM and the storage section 11, and executes programs by setting the RAM as a work area. The control section 10 realizes the formation of images on sheets of paper, the creation of image data by reading images from a document, the performance of communication with other devices via communication lines, and the like, by executing such programs. Sheets of paper and documents are examples of recording media.

The storage section 11 is a unit that stores data. The storage section 11 is provided with a storage medium (auxiliary storage) such as a hard disk or flash memory, and stores data that is received using the communication section 14, data that is created by the image forming apparatus 1 and the like. In addition, the storage section 11 may include a storage medium (removable media) that may be attached and detached such as a so-called memory card or USB memory, and a unit that writes/reads data to/from such a storage medium.

The display section 12 is provided with a display device such as a liquid crystal display or an organic EL (Electroluminescence) display and a touch panel (a touch screen) that is provided overlapping the display. A menu screen for operating the image forming apparatus 1 is displayed on the display section 12 under the controls of the control section 10.

The operation section 13 is provided with an operation pieces (such as a button or keys) for inputting data or instructions to the image forming apparatus 1, and supplies control signals according to pressed operation pieces to the control section 10. The input of various instructions to the image forming apparatus 1 is performed by a user operating the touch panel of the display section 12 or the operation section 13.

The communication section 14 is a unit that transmits and receives data. The communication section 14 is connected to a communication line, which is not shown in the figures, and functions as a communication interface that performs communication with external devices.

The image reading section 15 (an example of a reading unit) is an image scanner that reads documents optically and creates image data that represents images on the read documents. The image reading section 15 supplies the created image data to the image processing section 16.

The image processing section 16 is a unit that executes image processing on image data. For example, the image processing that is referred to in this instance is color correction and gradation correction. In a case in which a printing function is executed in the image forming apparatus 1, the image processing section 16 supplies image data on which image processing has been carried out, to the image forming section 17.

The image forming section 17 (an example of an image forming unit) is a unit that forms images on sheets of paper. The image forming section 17 is equipped with an image forming mechanism that forms toner images of each color component of Y (Yellow), M (Magenta), C (Cyan) and K (Black) on sheets of paper using an electrophotographic method. Additionally, the image forming mechanism is not limited to an electrophotographic method, and may use another recording method such as an ink jet method.

The transport section 18 (an example of a transport device) is a device that transports sheets of paper or documents. In the exemplary embodiment, the transport section 18 transports documents that the image reading section 15 reads. The transport section 18 is disposed in multiple locations in a transport pathway of documents. The fixing section 19 fixes images formed on sheets of paper by the image forming section 17 through heating.

Figure 2A:
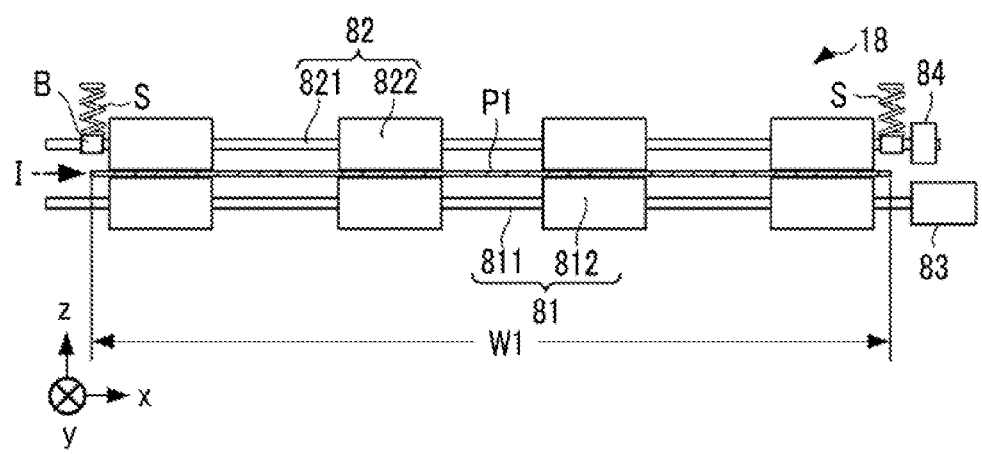
FIGS. 2A and 2B are views that show a configuration of a transport section according to a comparative example.
Figure 2B:
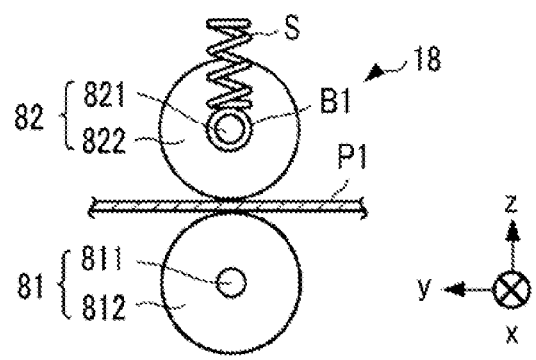

FIGS. 2A and 2B are views that show a configuration of the transport section 18 according to a comparative example. In the example of FIGS. 2A and 2B, the transport section 18 transports a document P1 with a width W1. Hereinafter, in the figure, in order to describe the disposition of each configuration of the transport section 18, the space in which each configuration is disposed will be referred to as an xyz right-handed coordinate system space. In addition, among the coordinate symbols that are shown in the figures, the symbol in which an x is drawn inside a circle with a white inside represents an arrow that faces a deep side from a paper surface front side. In the coordinate space, a direction that runs along an x axis is referred to as an x axis direction. In the same manner, a y component and a z component are defined as a y axis direction and a z axis direction. The x axis direction is a width direction of transported documents, the y axis direction is a transport direction of documents and the z axis direction is a thickness direction of documents. Hereinafter, in the z axis direction, a direction in which a z component decreases will be referred to as a −z direction.

FIG. 2A is a view when the transport section 18 is viewed from the transport direction. FIG. 2B is a view when the transport section 18 is viewed from an arrow I in FIG. 2A. The transport section 18 includes a driving roller 81, a driven roller 82, a motor 83, and a rotary encoder 84. The driving roller 81 (an example of a first roller) is configured by a rotating shaft 811 and multiple contact members 812 that are fixed to the rotating shaft 811. The contact members 812 are cylindrical members, the diameters of which are larger than the rotating shaft 811, and documents are interposed between the contact members 812 and the driven roller 82 (contact members 822 which will be described later). Multiple (four in the example of FIGS. 2A and 2B) contact members 812 are provided at predetermined intervals in the x axis direction. The motor 83 (an example of a driving section) is fixed to an end of the rotating shaft 811, and the rotating shaft 811 is driven to rotate in the transport direction of documents. When the rotating shaft 811 rotates, the contact member 812 also rotates following the rotating shaft 811, and documents are transported.

Figure 3:
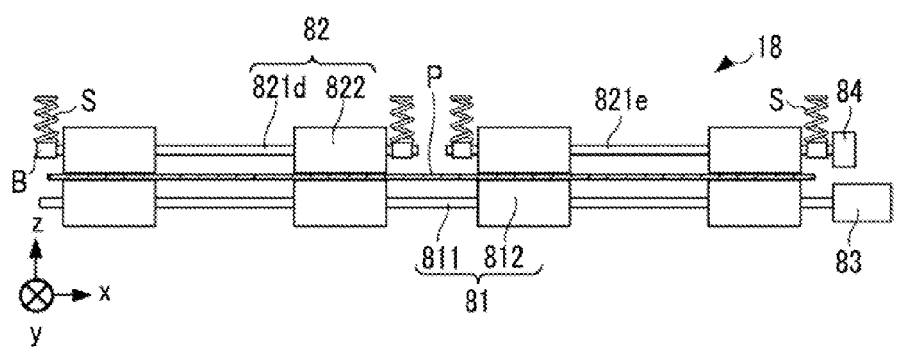
FIG. 3 is a different view that shows the configuration of the transport section according to the comparative example.

The driven roller 82 (an example of a second roller) is configured by a rotating shaft 821 and multiple contact members 822 that are fixed to the rotating shaft 821. The contact members 822 are cylindrical member, the diameters of which are larger than that of the rotating shaft 821. Multiple (four in the example of FIGS. 2A and 2B) contact members 822 are provided in positions that face the contact members 812. Both ends of the rotating shaft 821 are fixed to a housing (not illustrated) of the image forming apparatus 1 through an elastic member S such as a spring and a bearing B, and a force is applied to the rotating shaft 821 in the −z direction through the elastic member S. As a result of this force, the contact members 822 press documents against the driving roller 81, and documents are interposed between the contact members 822 and the contact members 812. Additionally, as shown in FIG. 3, the rotating shaft 821 of the driven roller 82 may be split in the x axis direction. In this case, both ends of each split rotating shaft 821 (821*d* and 821*e*) are fixed to a housing or the like of the image forming apparatus 1 through the elastic member S.

The rotary encoder 84 (an example of a measurement unit) is attached to an end of the rotating shaft 821 (an end section of a side to which the motor 83 is attached in the examples of FIGS. 2A and 2B, and FIG. 3), and is a device that measures a rotational speed of the rotating shaft 821. The rotary encoder 84 is used in order to measure the speed at which documents are transported (hereinafter, referred to as a "transport speed"). For example, the measurement of transport speed is performed in order for the image processing section 16 to correct distortion in images read by the image reading section 15. A transport speed of documents and a speed at which the driving roller 81 rotates, strictly differ. In the example in FIGS. 2A and 2B, the document P1 with the width W1 is transported, and each of the four contact members 822 comes into contact with the document P1 and rotates at a transport speed of the document P1. In this manner, in a case in which each of the contact members 822 comes into contact with documents and rotates when documents are transported, each of the contact members 822 causes the rotating shaft 821 to rotate at a transport speed of documents. Therefore, a practical transport speed is measured by the rotary encoder 84.

Figure 4A:
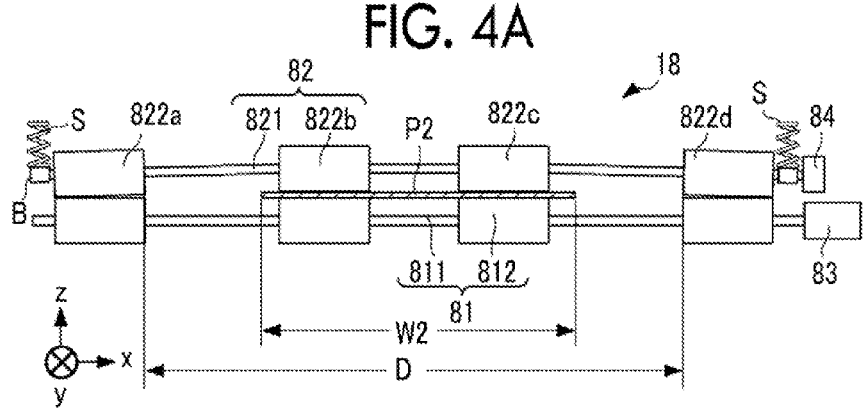
FIGS. 4A and 4B are views that show states in which a transport section transports a document with a narrow width according to a comparative example.
Figure 4B:
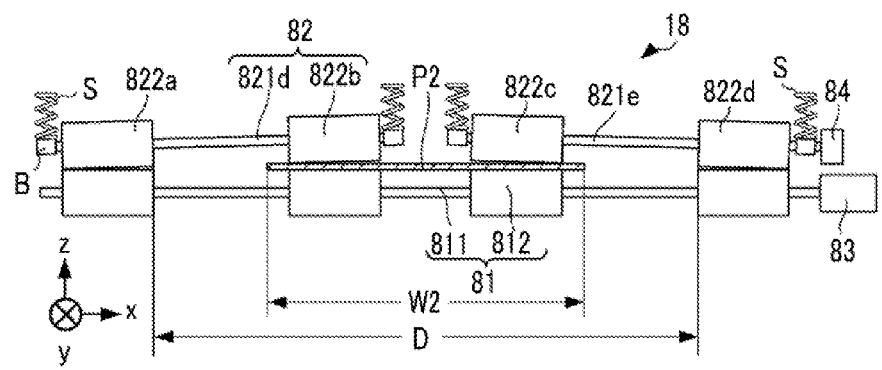

FIGS. 4A and 4B are views that show states in which the transport section 18 transports a document with a narrow width P2 according to a comparative example. FIG. 4A shows a state in which the transport section 18 that is shown in FIGS. 2A and 2B transports the document P2 with a width W2 (W2<W1), and FIG. 4B shows a state in which the transport section 18 that is shown in FIG. 3 transports the document P2. Additionally, in the exemplary embodiment, "narrow" represents the fact that the width of a document is more narrow than an interval D of the contact members 822, among the multiple contact members 822, that are positioned at both ends of the driven roller 82 (contact member 822*a* and 822*d* in the example of FIGS. 4A and 4B), and "wide" represents the fact that the width of a document is greater than or equal to the interval D.

In the example of FIGS. 4A and 4B, a contact member 822*b* and a contact member 822*c* which are positioned in the center of the driven roller 82 in the x axis direction, come into contact with the document P2. In addition, as a result of the rotating shaft 821 being inclined with respect to the rotating shaft 811 by an amount of the thickness of the document P2, the contact member 822*a* and the contact member 822*d* that are positioned at both ends of the driven roller 82 come into contact with the facing contact members 812 without interposing the document P2 therebetween. When a document with a narrow width is transported, the contact member 822*b* and the contact member 822*c* that come into contact with the document are examples of first members. When a document with a narrow width is transported, the contact member 822*a* and the contact member 822*d* that come into contact with the driving roller 81 are examples of second members. When the contact member 822*a* and the contact member 822*d* come into contact with the contact member 812, the contact member 822*a* and the contact member 822*d* rotate at a speed (that is, a speed at which the driving roller 81 rotates) at which the contact member 812 rotates, and cause the rotating shaft 821 to rotate at that speed. In a case in which a document with a narrow width is transported, since the rotating shaft 821 rotates at a speed different from a practical transport speed, the precision of the measurement of transport speed is reduced. The exemplary embodiment handles the abovementioned problem by adopting a configuration in which a force with which the contact member 822b and the contact member 822c cause the rotating shaft 821 to which the rotary encoder 84 is attached, to rotate, is greater than a force with which the contact member 822a and the contact member 822d cause the rotating shaft 821 to rotate. Additionally, of the multiple exemplary embodiments that will be described below, the second and third exemplary embodiments may be used in combination.

Figure 5:
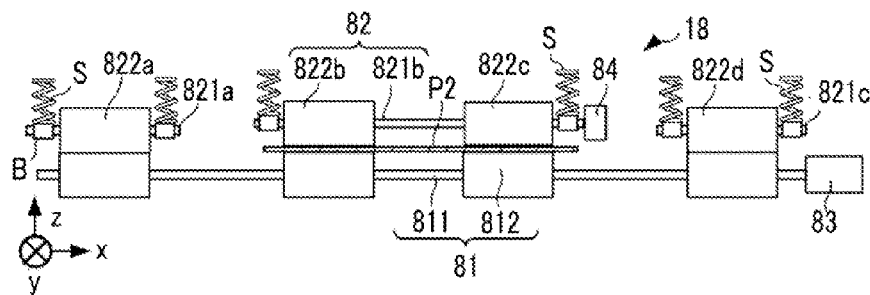
FIG. 5 is a view that shows a configuration of a transport section according to a first exemplary embodiment.

FIG. 5 is a view that shows a configuration of the transport section 18 according to a first exemplary embodiment. FIG. 5 shows a state in which the document P2 is transported. The transport section 18 that is shown in FIG. 5 differs from the configuration of the transport section 18 according to the comparative examples in that the rotating shaft 821 of the driven roller 82 is split into three, rotating shafts 821a, 821b and 821c, in the x axis direction, and that the rotary encoder 84 is fixed to the rotating shaft 821b. Both ends of each of the rotating shafts 821a, 821b and 821c are fixed to a housing or the like of the image forming apparatus 1 through the elastic member S. In the first exemplary embodiment, the contact member 822a, the contact member 822b, the contact member 822c, and the contact member 822d are respectively fixed to the rotating shaft 821a, the rotating shaft 821b and the rotating shaft 821c. That is, in the first exemplary embodiment, the contact member 822a and the contact member 822d are fixed to the rotating shafts 821 different from the contact member 822b and the contact member 822c. When the driven roller 82 is configured in this manner, a force with which the contact member 822a and the contact member 822d cause the rotating shaft 821 to rotate is not transmitted to the rotating shaft 821b to which the rotary encoder 84 is attached. Therefore, when a document with a narrow width is transported, even in a case in which the contact member 822a and the contact member 822d come into contact with the facing contact members 812, and rotate at a speed at which the driving roller 81 rotates, a practical transport speed is measured by the rotary encoder 84.

Figure 6:
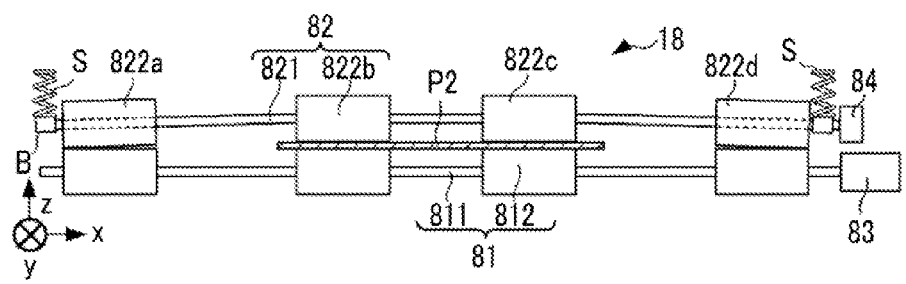
FIG. 6 is a view that shows a configuration of a transport section according to a second exemplary embodiment.

FIG. 6 is a view that shows a configuration of the transport section 18 according to a second exemplary embodiment. FIG. 6 shows a state in which the document P2 is transported. The transport section 18 that is shown in FIG. 6 differs from the configuration of the transport section 18 according to the comparative examples in that the contact member 822a and the contact member 822d slide along the rotating shaft 821. That is, in the second exemplary embodiment, the contact member 822b and the contact member 822c are fixed to the rotating shaft 821, and the contact member 822a and the contact member 822d are not fixed to the rotating shaft 821. In FIG. 6, a region of the rotating shaft 821 that is shown by a dotted line shows a region in which the contact member 822a and the contact member 822d slide along the rotating shaft 821. When the driven roller 82 is configured in this manner, the contact member 822a and the contact member 822d idles with respect to the rotating shaft 821. Therefore, when a document with a narrow width is transported, even in a case in which the contact member 822a and the contact member 822d come into contact with the facing contact members 812, and rotate at a speed at which the driving roller 81 rotates, in comparison with the contact member 822b and the contact member 822c, it is difficult for the contact member 822a and the contact member 822d to cause the rotating shaft 821 to rotate, and therefore, a circumstance in which the precision of the measurement of the transport speed is reduced, is prevented.

Figure 7:
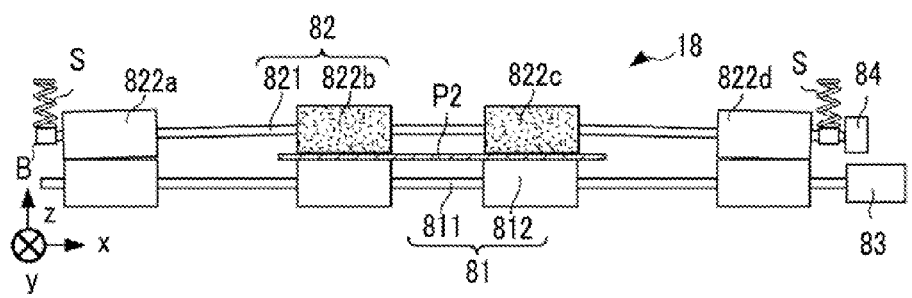
FIG. 7 is a view that shows a configuration of a transport section according to a third exemplary embodiment.

FIG. 7 is a view that shows a configuration of the transport section 18 according to a third exemplary embodiment. FIG. 7 shows a state in which the document P2 is transported. The transport section 18 that is shown in FIG. 7 differs from the configuration of the transport section 18 according to the comparative examples in that the surfaces of the contact member 822b and the contact member 822c (surfaces of a side that comes into contact with documents) are formed using a material that differs from that of the surfaces of the contact member 822a and the contact member 822d. In the third exemplary embodiment, it is configured so that a friction force that works at contact surfaces between the contact member 822b and the contact member 822c, and documents is greater than a friction force that works at contact surfaces between the contact member 822a and the contact member 822d, and the contact member 812. For example, the adjustment of friction forces is performed by coating the surfaces of the contact member 822b and the contact member 822c which are formed with a normal resin material, with rubber such as urethane rubber with a thickness of approximately 20 μm. In this case, coating is not performed on the surfaces of the contact member 822a and the contact member 822d. Additionally, the adjustment of friction forces may be performed by forming the contact member 822b and the contact member 822c with a material in which a coefficient of friction is higher than that of the contact member 822a and the contact member 822d. When the driven roller 82 is configured in this manner, it becomes difficult for the contact member 822b and the contact member 822c to slide with respect to documents in comparison with a case in which the adjustment of friction forces is not performed. Therefore, when a document with a narrow width is transported, even in a case in which the contact member 822a and the contact member 822d come into contact with the facing contact members 812, and rotate, in comparison with the contact member 822a and the contact member 822d, it is easier for the contact member 822b and the contact member 822c to cause the rotating shaft 821 to rotate, and therefore, a circumstance in which the precision of the measurement of the transport speed is reduced, is prevented.

Additionally, in the third exemplary embodiment, the adjustment of friction forces may be performed by setting the diameters of the contact member 822b and the contact member 822c to be larger than those of the contact member 822a and the contact member 822d. In this case, since an area over which the contact member 822b and the contact member 822c come into contact with the document P2 is larger than an area over which the contact member 822a and the contact member 822d come into contact with the contact member 812, in comparison with a case in which the diameters of the contact members 822a to 822d are all the same, it is difficult for the contact member 822b and the contact member 822c to slide with respect to documents. In addition, the adjustment of friction forces may be performed by combining the adjustment of the material and the adjustment of the diameter.

A force with which the contact member 822b and the contact member 822c according to the abovementioned exemplary embodiments cause the rotating shaft 821 to which the rotary encoder 84 is attached, to rotate, is greater than a force with which the contact member 822a and the contact member 822d cause the rotating shaft 821 to rotate. Therefore, in a case in which a document with a narrow width is transported, a circumstance in which the precision of the measurement of the transport speed is reduced, is prevented.

Exemplary embodiments of the present invention have been described above, but the present invention is not limited to the abovementioned exemplary embodiments, and it is possible to implement various other exemplary embodiments. Additionally, the various aspects below may be combined.

The application of the transport section 18 is not limited to transportation of documents that the image reading section 15 reads. For example, the transport section 18 may be used in order to transport sheets of paper. For example, in a case in which the image forming section 17 is equipped with an ink jet type image forming mechanism, the transport section 18 may transport sheets of paper to the image forming section 17. In addition, the widths of sheets of paper and documents that the transport section 18 transports, are not limited to the width W1 and the width W2.

The configuration of the transport section 18 is not limited to the configurations that are shown in the exemplary embodiments. For example, the numbers of the contact members that the driving roller 81 and the driven roller 82 are provided with, are not limited to four.

Figure 8:
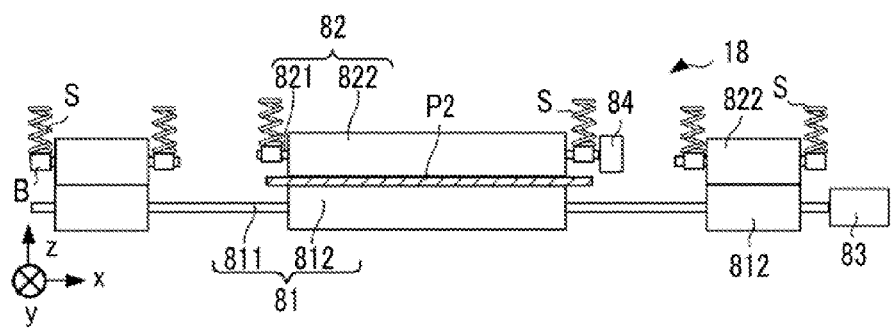
FIG. 8 is a view that shows a configuration of a transport section according to a modification example.

FIG. 8 is a view that shows a configuration of the transport section 18 according to a modification example. FIG. 8 shows a modification example of the transport section 18 that is shown in the first exemplary embodiment (FIG. 5). In this example, the driving roller 81 and the driven roller 82 include three contact members. In addition, the length in the x axis direction of the contact member 812 and the contact member 822 that are positioned in the center in the x axis direction is greater than those of the contact members 812 and the contact members 822 that are positioned at both ends in the x axis direction. Additionally, the second exemplary embodiment (FIG. 6) and the third exemplary embodiment (FIG. 7) may be modified in the same manner.

The object of the rotary encoder 84 measuring the transport speed of documents is not limited to correction by the image processing section 16. For example, the rotary encoder 84 may be adopted with an object of adjusting the transport speed of sheets of paper or documents.

The configuration of the image forming apparatus 1 is not limited to the configuration used in the exemplary embodiments. For example, the image forming section 17 need not necessarily be an image forming section that is equipped with an image forming mechanism that forms images by overlapping multiple toner images, and may be equipped with an image forming mechanism that forms toner images of single color.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transport device comprising:
a first roller that is driven to rotate by a driving section, and transports a recording medium;
a second roller that includes a second rotating shaft and a second rotating section, and pushes the transported recording medium against the first roller, the second rotating section including a first member that comes into contact with the recording medium, and a second member that comes into contact with the first roller when the recording medium having a predetermined size is transported; and
a measurement unit that measures speed at which second rotating shaft rotates,
wherein a force with which the first member rotates the second rotating shaft is greater than a force with which the second member rotates the second rotating shaft, and
wherein the first member and the second member are provided independently on the second rotating shaft, and wherein the measurement unit is provided on the second rotating shaft on which the first member is provided.

2. An image forming apparatus comprising:
an image forming section that forms images on a recording medium; and
the transport device according to claim 1 that transports the recording medium.

3. An image reading apparatus comprising:
an image reading section that reads images on a recording medium; and
the transport device according to claim 1 that transports the recording medium.

4. A transport device comprising:
a first roller that is driven to rotate by a driving section, and transports a recording medium;
a second roller that includes a second rotating shaft and a second rotating section, and pushes the transported recording medium against the first roller, the second rotating section including a first member that comes into contact with the recording medium, and a second member that comes into contact with the first roller when the recording medium having a predetermined size is transported; and
a measurement unit that measures speed at which second rotating shaft rotates,
wherein a force with which the first member rotates the second rotating shaft is greater than a force with which the second member rotates the second rotating shaft,
wherein the first member is fixed to the second rotating shaft, and
wherein the second member slides along the second rotating shaft.

5. A transport device comprising:
a first roller that is driven to rotate by a driving section, and transports a recording medium;
a second roller that includes a second rotating shaft and a second rotating section, and pushes the transported recording medium against the first roller, the second rotating section including a first member that comes into contact with the recording medium, and a second member that comes into contact with the first roller when the recording medium having a predetermined size is transported; and
a measurement unit that measures speed at which second rotating shaft rotates,
wherein a force with which the first member rotates the second rotating shaft is greater than a force with which the second member rotates the second rotating shaft, and
wherein a coefficient of friction of a surface of the first member is greater than a coefficient of friction of a surface of the second member.

* * * * *